United States Patent [19]

Lo

[11] Patent Number: 5,310,010
[45] Date of Patent: May 10, 1994

[54] AUTOMATIC OVERLOAD RELEASE AND POWER STOPPAGE DEVICE

[76] Inventor: Juey Y. Lo, 3F, No. 2-1, 160 Alley, Yu Hsi Street, Yung Ho City, Taipei, Taiwan

[21] Appl. No.: 102,603

[22] Filed: Aug. 5, 1993

[51] Int. Cl.⁵ .............................................. B25B 23/14
[52] U.S. Cl. .................. 173/178; 192/56 R
[58] Field of Search .............. 173/176, 177, 178, 181; 192/56 R, 0.034, 150

[56] References Cited

U.S. PATENT DOCUMENTS

| | | | |
|---|---|---|---|
| 3,242,996 | 3/1966 | Wright et al. | 173/178 |
| 3,477,521 | 11/1969 | Kiester et al. | 173/176 |
| 4,078,618 | 3/1978 | De Pagter et al. | 173/178 |
| 4,265,320 | 5/1981 | Tanaka et al. | 173/178 |
| 4,480,699 | 11/1984 | Elmer | 173/176 |
| 4,880,064 | 11/1989 | Willoughby et al. | 173/178 |
| 5,054,588 | 10/1991 | Thorp et al. | 173/178 |

*Primary Examiner*—Scott Smith
*Attorney, Agent, or Firm*—Pro-Techtor International

[57] ABSTRACT

An automatic overload release and power stoppage device consisted of a central control mechanism, a power switching mechanism, a power output mechanism, a torque control mechanism, and a release control mechanism, whereby the central control rod of the central control mechanism is moved upwards to trigger the power switch of the power switching mechanism in turning the main shaft thereof and the output shaft as the output shaft of the power output mechanism; the central control rod is moved downwards by the release control ring of the release control mechanism to cut off power source as the torsional force surpasses the critical level set by a torque control mechanism.

8 Claims, 16 Drawing Sheets

AUTOMATIC OVERLOAD RELEASE AND POWER STOPPAGE DEVICE

BACKGROUND OF THE INVENTION

The present invention relates to an automatic overload release and power stoppage device installed in a power tool to automatically cut off power supply upon an overload.

In a motor-driven or pneumatic screw driver, drill, or any of a variety of torque tools, there is generally provided an overload protecting device to protect against overload. The most commonly used overload protecting device is an overload circuit breaker. FIG. 15 illustrates an overload circuit breaker for a power tool according to the prior art. The shaft of the power tool has a through hole into which a link is inserted. As the shaft is depressed, the link to turn on the power switch. Power supply is sent through a triac, then rectified, and then sent to the motor, causing the motor to produce a torsional force. As the workpiece, for example: a screw or nut, is fastened tight, the clutch provides a signal to trigger the circuit breaker, causing it to cut off the power switch of the motor. By means of the operation of a time delay circuit, the circuit breaker is started again to short circuit the two opposite poles of the motor, and therefore the motor is stopped. Sparks are produced each time the motor or the circuit breaker is started. The sparks will damage the carbon brush and the rectifier of the motor easily. This structure of circuit breaker is complicated, and expensive to manufacture. Further, it needs much installation space. During the operation of the circuit breaker, the triac may be falsely triggered by serge. If the triac is triggered falsely as the circuit breaker is electrically connected, a short circuit will occur, the related parts will be burnt out. If a surge absorber is installed, a satisfactory result is still not achievable, and much installation space is needed.

SUMMARY OF THE INVENTION

The present invention eliminates the aforesaid problems. The present invention uses a mechanical mechanism to control overload release. Therefore, sparks will be produced only when the motor is started, and the service life of the motor and carbon brush of the power tool is extended. The critical torque can be adjusted by means of a torque regulating ring mounted on the outside of the power tool. The torque regulating ring is controlled to press a spring against a lower driven member, causing the steel ball set of an upper driven member to push a release control ring downwards via the lower driven member, for allowing a central control rod to release from the power switch of the power tool, and therefore the motor is stopped. At the same time, the steel ball set on the main shaft of the power tool is separated from the roller set of the upper driven member, and therefore the operation of the power tool is stopped. As the power tool is removed from the workpiece, the respective parts are moved back to their former positions by springs.

DETAILED DESCRIPTION OF THE PREFERRED EMBODIMENT

Figure 1:
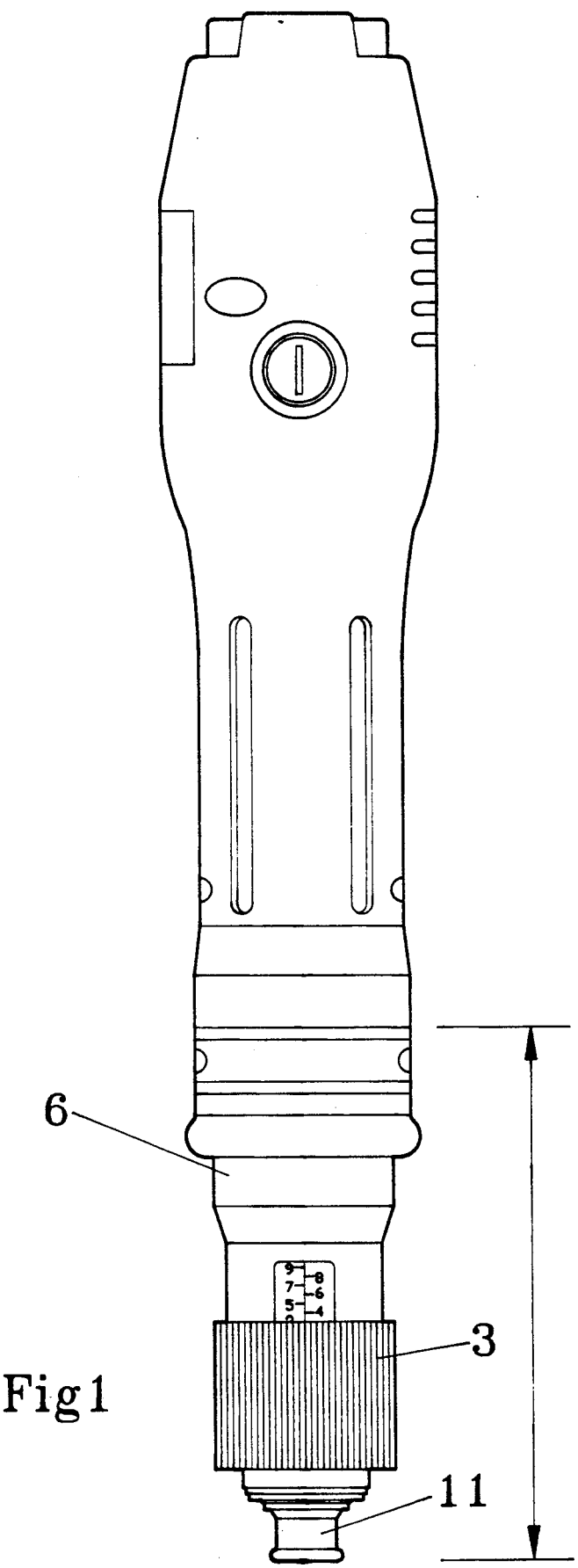
FIG. 1 illustrates the outer configuration of a power tool according to the present invention.
Figure 2:
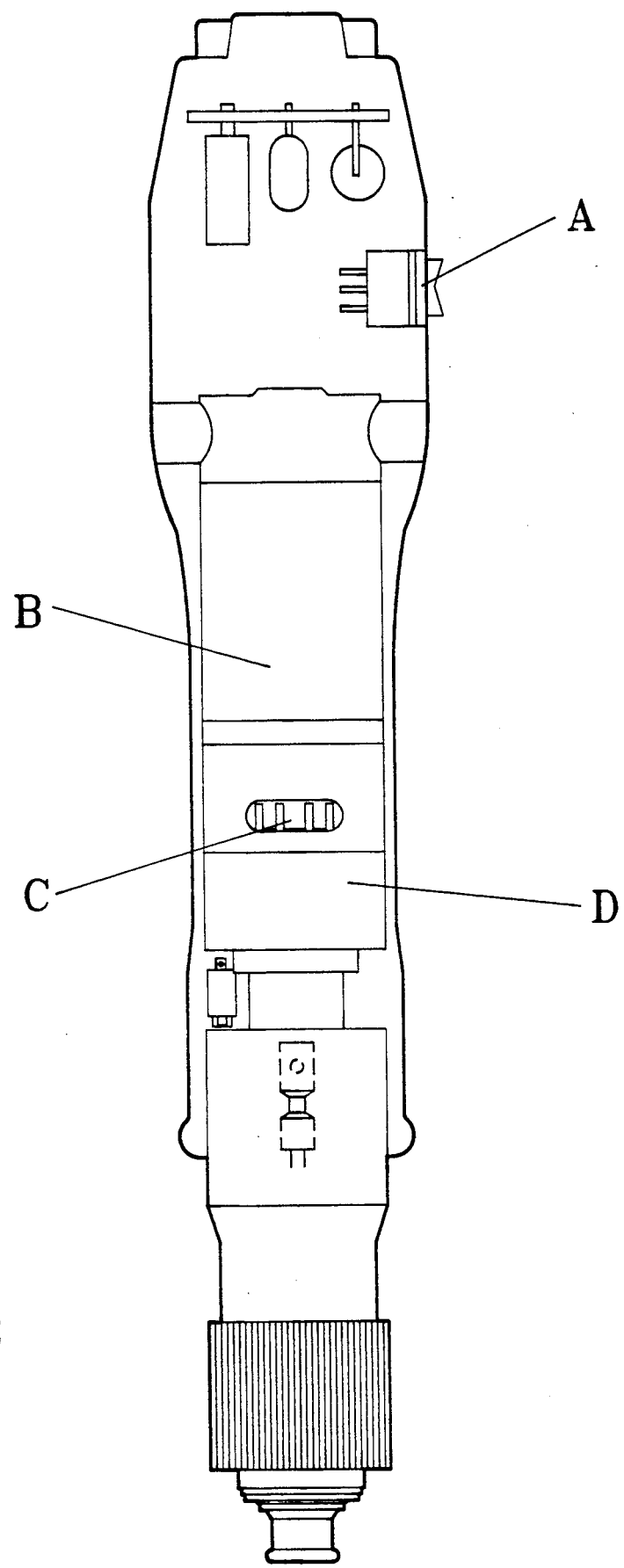
FIG. 2 is a longitudinal sectional view of the power tool shown in FIG. 1.

Referring to FIGS. 1 and 2, a power tool according to the present invention is generally comprised of a switch A, a motor B, a fan C, a speed reducing gear D, and an automatic overload release and power stoppage device. The automatic overload release and power stoppage device is generally comprised of a central control mechanism E (see FIG. 3), a power switching mechanism F (see FIG. 4), a power output mechanism G (see FIG. 5), a torque control mechanism H (see FIG. 6), and a release control mechanism I (see FIG. 7).

Figure 3:
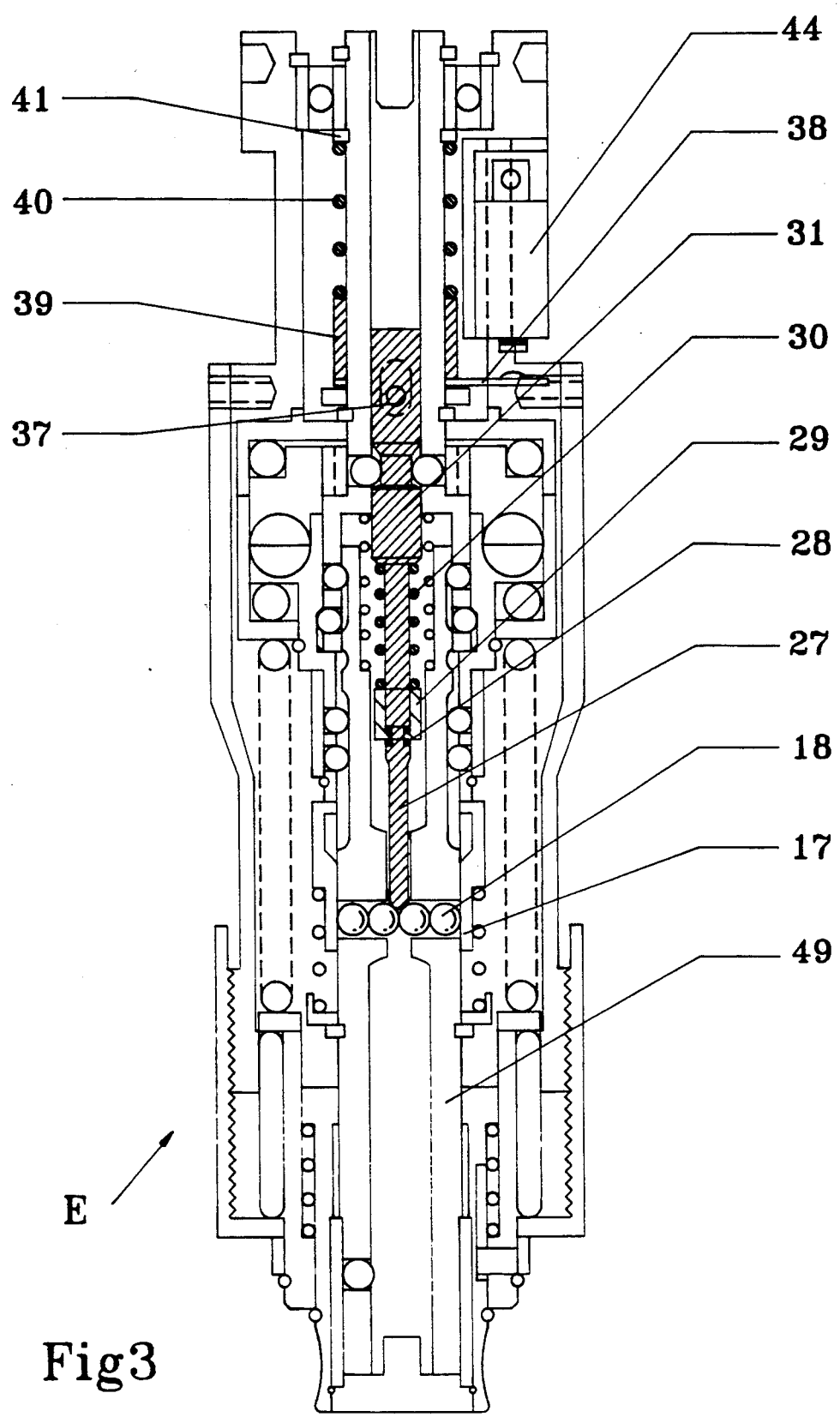
FIG. 3 is a sectional view showing the arrangement of the central control mechanism of the present invention in the power tool shown in FIG. 1.

Referring to FIG. 3, the central control mechanism E is consisted of a central control rod 27, a first stop ring 28, a first metal ring 29, a first spring 30, a sliding bushing 31, a spring pin 37, a switch control lever 38, a second spring 40, a second stop ring 41. The central control rod 27 has a through hole 271 into which the spring pin 37 is inserted to link the switch control lever 38 so as to control the switching of a microswitch 44, which is for On/Off power control.

Figure 4:
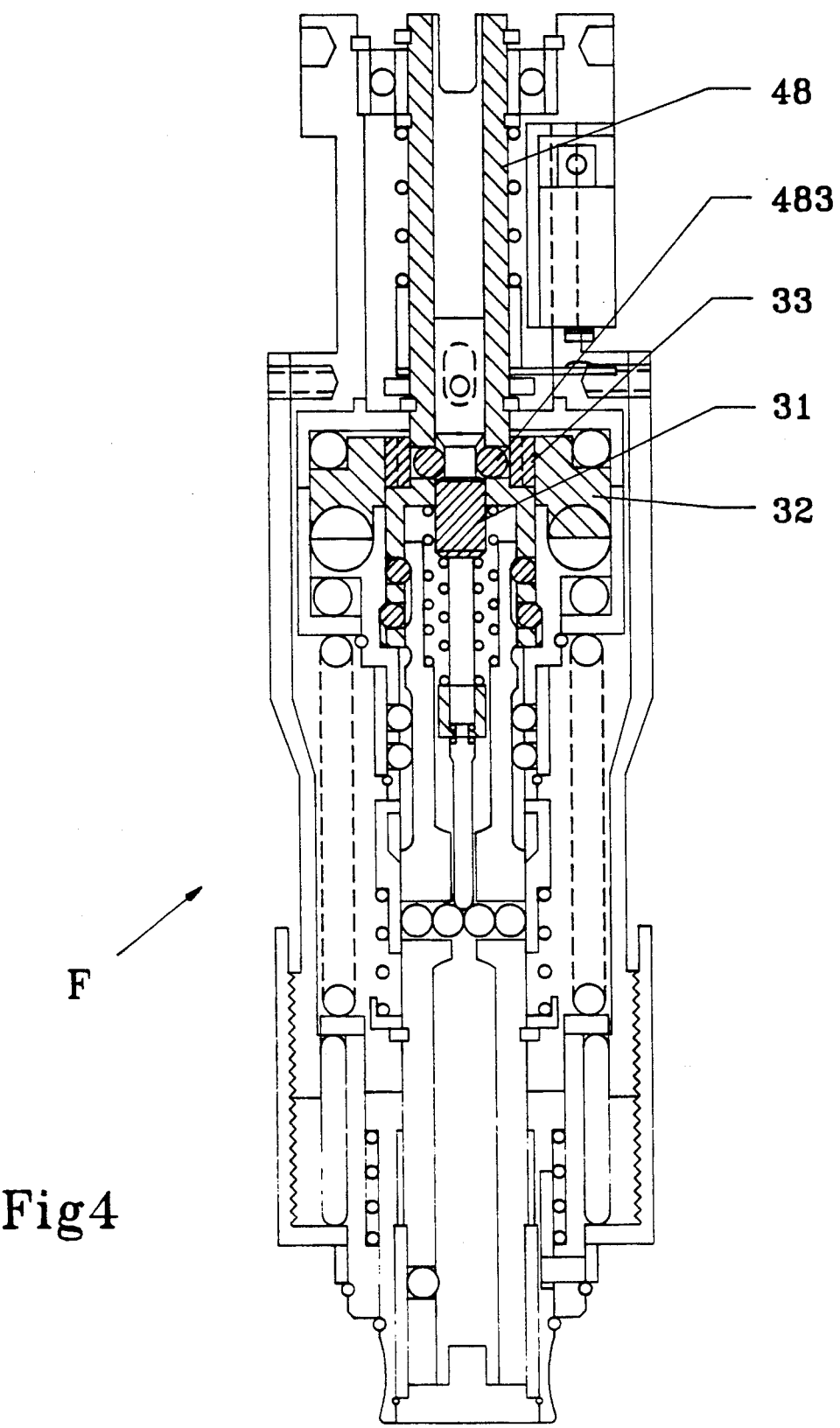
FIG. 4 is a sectional view showing the arrangement of the power switching mechanism of the present invention in the power tool shown in FIG. 1.

Referring to FIG. 4, the power switching mechanism F is consisted of the aforesaid sliding bushing 31, a ring-shaped upper driven member 32, a roller set 33, a first steel ball set 483, and a main shaft 48. The power switching mechanism F is controlled by the sliding bushing 31 on the central control rod 27 to move the first steel ball set 483 so as to control the engagement between the main shaft 48 and the roller set 33. The ring-shaped upper driven member 32 is integrally shape formed. The arrangement of the roller set 33 for transmission control is adopted for the advantages of easy installation and high durability.

Figure 5:
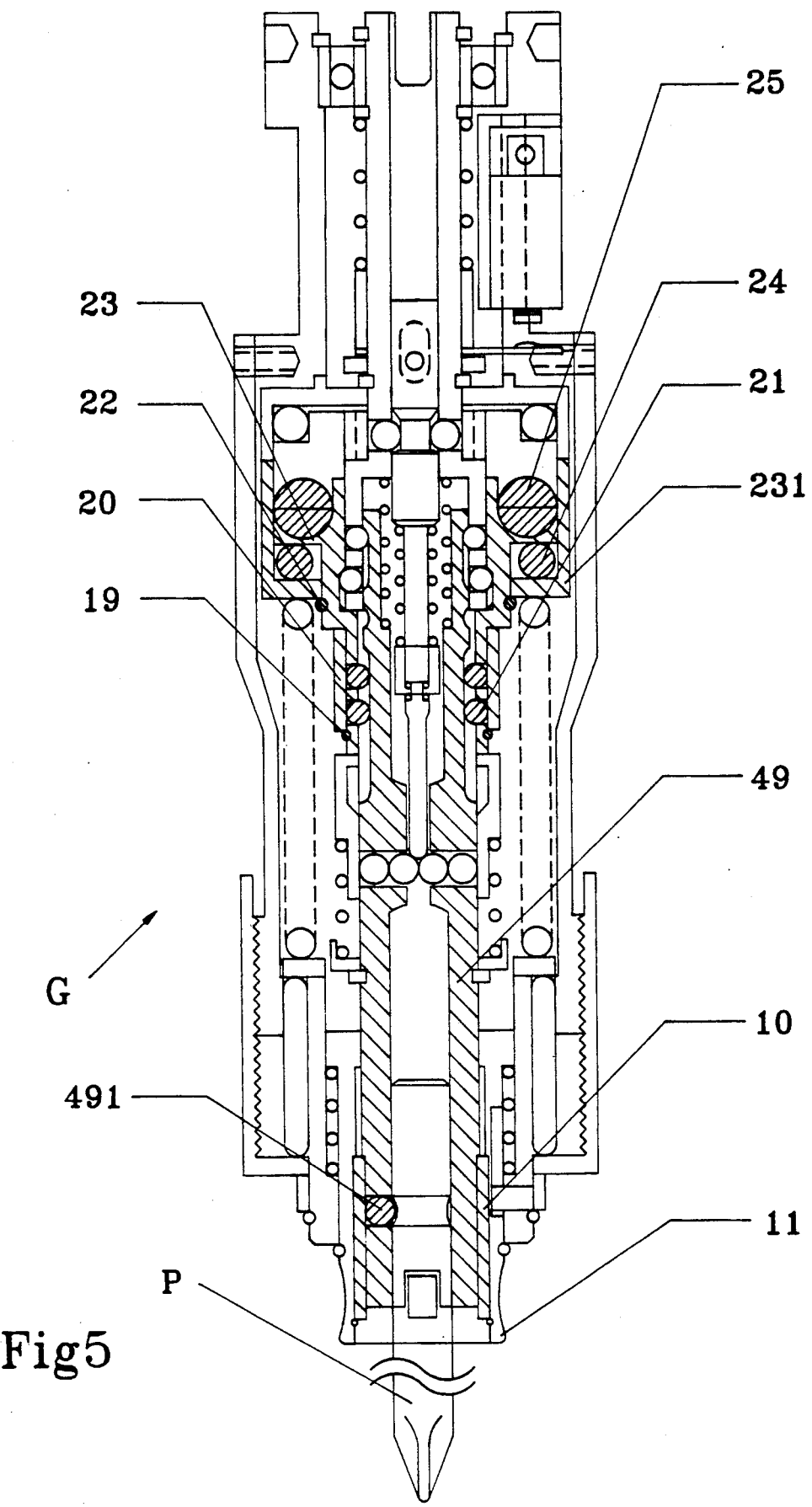
FIG. 5 is a sectional view showing the arrangement of the power output mechanism of the present invention in the power tool shown in FIG. 1.

Referring to FIG. 5, the power output mechanism G is consisted of a third stop ring 19, a second metal ring 20, a second steel ball set 21, a fourth stop ring 22, a lower driven member 23, a lower thrust bearing 231, a third steel ball set 24, a fourth steel ball set 25, a third metal ring 10, an output shaft 49, and a steel ball 491. As the output shaft 49 is depressed, the central control mechanism E and the power switching mechanism F are driven to work, and therefore the upper driven member 32 and the lower driven member 23 are driven in proper order to turn the output shaft 49 via the second steel ball set 21. The steel ball 491 is fastened between the output shaft 49 and the bit P being coupled to the output shaft 49. The steel ball 491 and the third metal ring 10 ensures positive connection between the output shaft 49 and the bit P. During the operation of the device, the third metal ring 10 is carried to rotate, and the steel ball 491 does not contact the bit lock ring 11, therefore the output shaft 49 can be smoothly moved up and down and will not be stuck during its operation.

Figure 6:
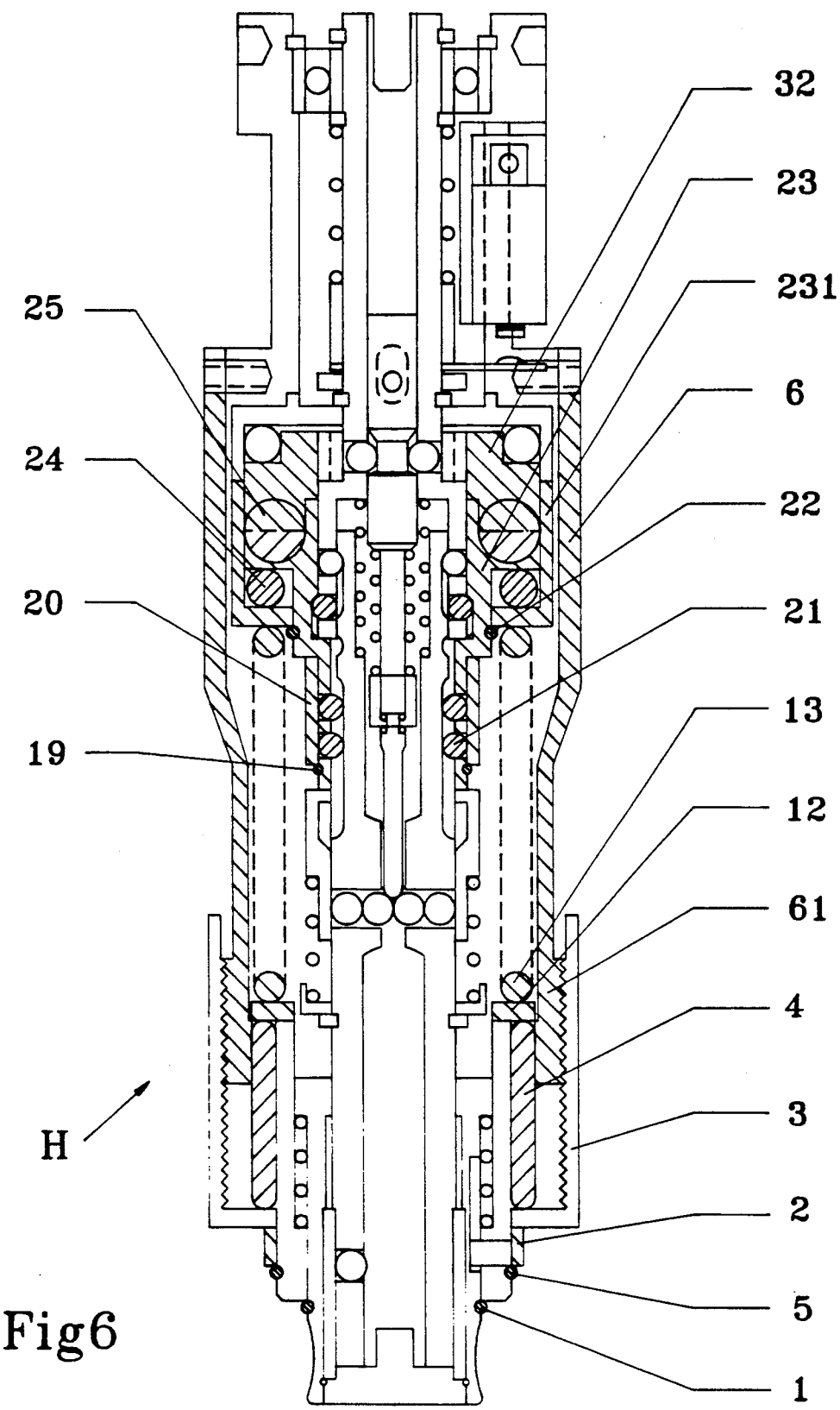
FIG. 6 is a sectional view showing the arrangement of the torque control mechanism of the present invention in the power tool shown in FIG. 1.

Referring to FIG. 6, the torque control mechanism H is consisted of a fifth stop ring 1, a sixth stop ring 2, a torque regulating ring 3, a round rod 4, a seventh stop ring 5, a torque member holder 6, a spring washer 12, a torque control spring 13, the aforesaid third stop ring 19, the aforesaid second metal ring 20, the aforesaid second steel ball set 21, the aforesaid fourth stop ring 22, the aforesaid lower driven member 23, the aforesaid lower thrust bearing 231, the aforesaid third steel ball set 24, the aforesaid fourth steel ball set 25, and the aforesaid upper driven member 32. The pressure of the torque control spring 13 is adjusted by turning the torque regulating ring 3 upwards or downwards on the torque member holder 6, to let the lower driven member 23 and the upper driven member 32 escape from each other upon an overload. The arrangement of the torque regulating ring 3 greatly facilitates the regulation of torque force without the use of any tools.

Figure 7:
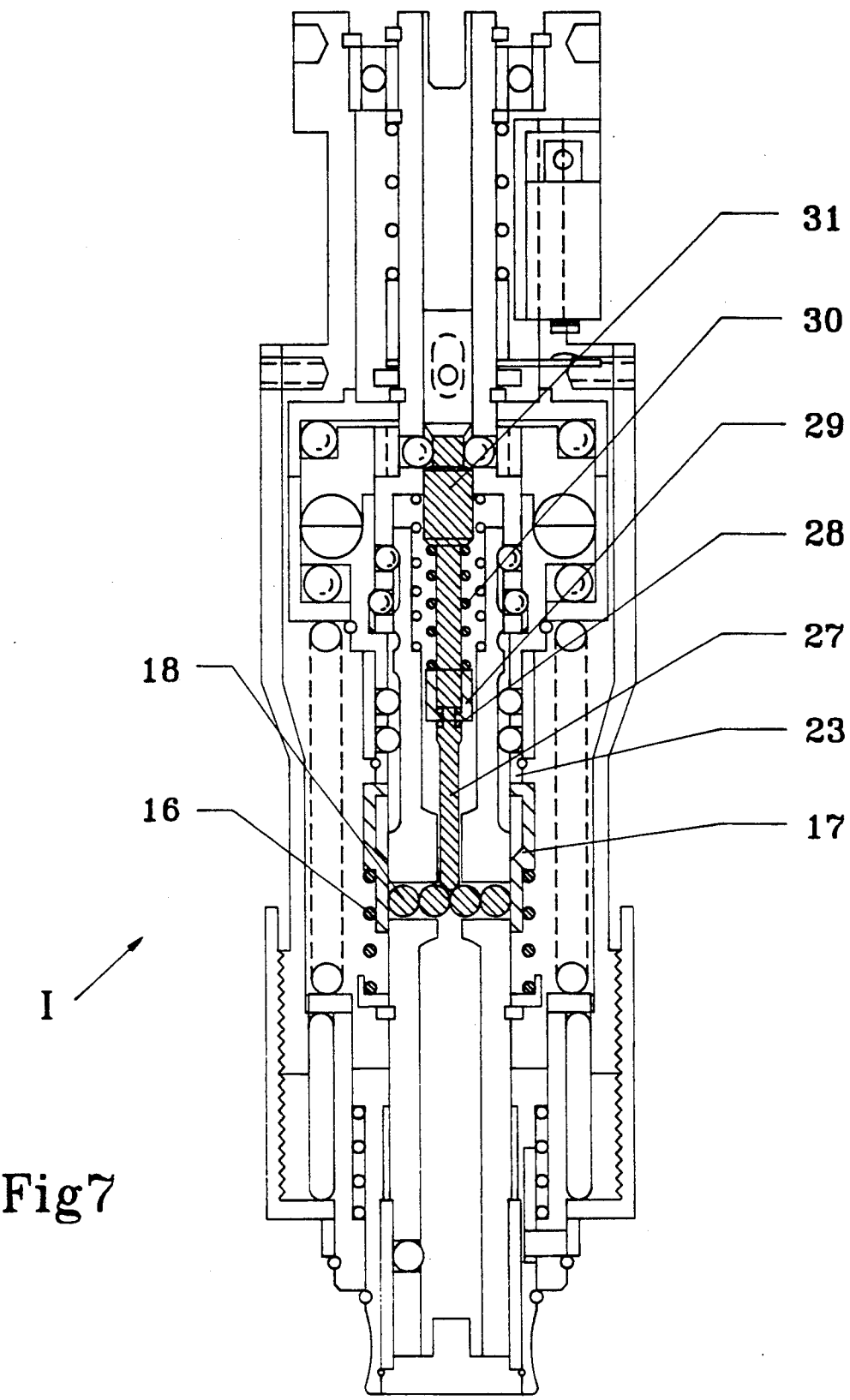
FIG. 7 is a sectional view showing the arrangement of the release control mechanism of the present invention in the power tool shown in FIG. 1.

Referring to FIG. 7, the release control mechanism I is consisted of a third spring 16, a release control ring 17, a fifth steel ball set 18, the aforesaid central control rod 27, the aforesaid first stop ring 28, the aforesaid first metal ring 29, the aforesaid first spring 30, and the aforesaid sliding bushing 31. As the torque reaches the predetermined level, the lower driven member 23 is driven to move the release control ring 17 downwards, for allowing the central control mechanism E to move downwards so as to turn off power supply.

The torque control mechanism H is controlled to regulate the torque, so that the lower driven member 23 automatically releases from power source upon an overload. The process of the central control rod 127 from the working status to the stoppage status is outlined hereinafter with reference to FIGS. 10 and 11. As the output shaft 49 is depressed, the cam (or steel ball) 321 of the upper driven member 32 of the torque control mechanism H is initiated by the power switching mechanism to drive the lower driven member 23 via the fourth steel ball set 25, and therefore the output shaft 49 is turned by the lower driven member 23. As the torque surpasses the predetermined level, the fourth steel ball set 25 is moved downwards by the cam 321 of the upper driven member 32 to push the release control ring 17 downwards via the lower driven member 23. As the release control ring 17 is moved downwards, the fifth steel ball set 18 is pushed by the tip 272 of the central control rod 27 into the inside space 171 of the release control ring 17, and therefore the central control mechanism E moves downwards to release power switch, causing stoppage of the power tool. As the power tool is removed from the workpiece, the output shaft 49 is immediately pushed back to its former position by a spring 26. As the output shaft 49 moves back, the fifth steel ball set 18 is moved away from the tip 272 of the central control rod 27 for allowing the release control ring 17 to be pushed back by the third spring 16 to contact the lower driven member 23 again, and therefore the central control rod 27 is moved downwards to the waiting status by the second spring 40, the bushing 39, the control switch control lever 38, and the spring pin 37.

The reason when the sliding bushing 31 is made to slide on the central control rod 27 is explained now. As the inside hole of the upper driven member 32, the roller set 33, and the first steel ball set 483 are aligned, the sliding bushing 31 can not push them to displace. If the sliding bushing 31 is integrally made on the central control rod 27, the central control rod 27 is prohibited from moving upwards as the upper driven member 32, the roller set 33, the first steel ball set 483 are aligned. Because the sliding bushing 31 and the central control rod 27 are separately made, the central control rod 27 moves upwards to switch on the microswitch 44, as the pressure applied to the power tool against the workpiece surpasses the first spring 30, causing the motor to turn the main shaft.

The lower driven member 23 has a recessed hole 232 which works with the second steel ball set 21. As the torque reaches the predetermined range, the fourth steel ball set 25 is pushed downwards by the cam 321 of the upper driven member 32 to move the lower driven member 23, causing the second steel ball set 21 to move into the longitudinal sliding way 4902 on the output shaft 49, and therefore the output shaft 49 is rotated. At the same time, the lower driven member 23 is moved along the output shaft 49. If the output shaft 49 is carried downwards as the lower driven member 23 slides downwards during the operation of the power tool, a torsional error may occur. This problem is eliminated. The main shaft 48 comprises a sixth steel ball set 481. As the lower driven member 23 moves downwards, the recessed hole 232 becomes relatively reduced, causing the sixth steel ball set 481 to engage into an annular groove 493 around the output shaft 49. As the fourth steel ball set 25 moves over the cam 321, the lower driven member 23 is pushed back to its former position by the torque control spring 13, and the sixth steel ball set 481 is released from the annular groove 493 for allowing the output shaft 49 to be moved longitudinally.

The cam 321 is integrally made on the upper driven member 32. As the cam 321 of the upper driven member 32 engages the first steel ball set 483 to transmit power, the contact points of the cam 321 with the first steel ball set 483 keep unchanged, and therefore the upper driven member 32 may be worn out quickly. The roller set 33 is used to perform the function of the cam 321. As the roller set 33 engages the first steel ball set 483 to transmit power, it is rotated to reduce friction resistance. Therefore, the arrangement of the roller set 33 greatly extends the service life of the upper driven member 32.

Referring to FIGS. 1, 2, 8, 9, 10, 11, and 12, the main shaft 48 is made from a hollow, stepped tube, comprising a longitudinal through hole 485 through its length, a series of holes 4831 in the middle into which the first steel ball set 483 inserts, two series of holes 4811;4812 around the wider rear end thereof into which the sixth steel ball set 481 and the seventh steel ball set 482 are respectively inserted. An upper thrust bearing 35 is mounted around the main shaft 48 to hold the upper driven member 35 around the output shaft 48 via a steel ball set 34. The upper driven member 32 comprises a plurality of longitudinal grooves 322 spaced around the inside wall thereof into which the roller set 33 is inserted to engage the first steel ball set 483. The cam 321 is symmetrically formed on the upper driven member 32 on the same side at two opposite locations. The lower thrust bearing 231 is mounted around the lower driven member 23 to hold the third steel ball set 24 on the inside around the lower driven member 23. The fourth steel ball set 25 is mounted around one end face of the lower driven member 23, and engaged with the upper driven member 32. The lower driven member 23 comprises a plurality of apertures 2312 around the rear extension tube thereof into which the second steel ball set 21 inserts. The recessed hole 232 is formed on the lower driven member 23 on the wider front end thereof. The second metal ring 20 is mounted around the rear extension tube of the lower driven member 23 to hold the second steel ball set 21 in the apertures 2312. The second stop ring 19 and the third stop ring 22 are respectively fastened around the lower driven member 23 to retain the second metal ring 20 and the lower thrust bearing 231 in place. The rear end of the lower driven member 23 stops against the release control ring 17. The third spring 16 is mounted around the release control ring 17 by retained in place by a stop ring 15. The front end of the output shaft 49 is inserted into the main shaft 48. The sixth steel ball set 481 and the seventh steel ball set 482 are respectively disposed around a first annular groove 492 and a second annular groove 493 around the front end of the output shaft 49 to confine the longitudinal moving range of the output shaft 49. The longitudinal slide way 4902 extends from the second annular groove 493. The output shaft 494 further comprises a series of holes 494 on the middle neck portion thereof into which the fifth steel ball set 18 is respectively inserted and held in place by the release control ring 17. The torque member holder 6 has a rear end coupled to a mounting member 42. The front end of the torque member holder 6 is fixed in place by the fourth and fifth stop rings 2;1 and a stop pin 7. The torque regulating ring 3 has an inner thread 311 meshed with an outer thread 61 on the torque member holder 6. The round rod 4 is inserted into an end through hole 62 on the torque member holder 6 to hold the spring washer 12 and the torque control spring 13. The torque control spring 13 is stopped against the lower thrust bearing 231. By turning the torque regulating ring 3 on the torque member holder 6 in either direction, the pressure of the torque control spring 13 on the lower driven member 23 is adjusted. The microswitch 44 is fastened to the mounting member 42 by a casing 43.

The central control rod 27 is disposed inside the hollow main shaft 48, having a pin hole 271 on one bigger end thereof. The spring pin 37 is inserted through an oblong through hole 485 on the main shaft 48 and the pin hole 271 on the central control rod 27 to retain the central control rod 27 inside the main shaft 48. Therefore, the central control rod 27 can be moved axially inside the main shaft 48 within the length of the oblong through hole 485. The spring pin 37 is moved to control the switching of the microswitch 44 via the switch control lever 38. The sliding bushing 31 is mounted around the central control rod 27 and retained in place by the first spring 30, the first stop ring 28, and the first metal ring 29. As the central control rod 27 is moved axially, the neck portion 271 of the central control rod 27 pushes the first steel ball set 483 to switch the power system.

Figure 8:
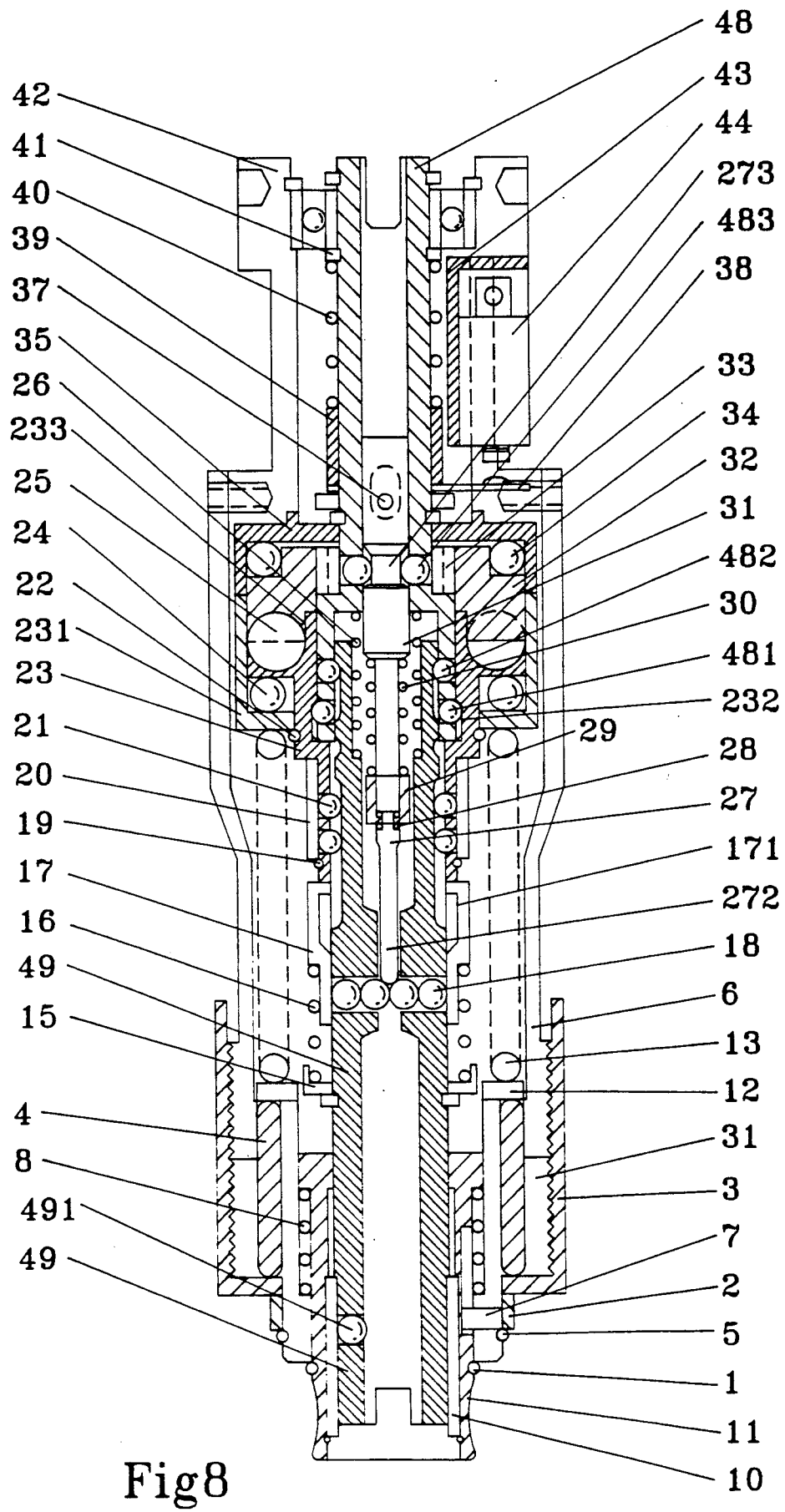
FIG. 8 is a sectional view showing the transmission mechanism of the power tool in a waiting status.
Figure 9:
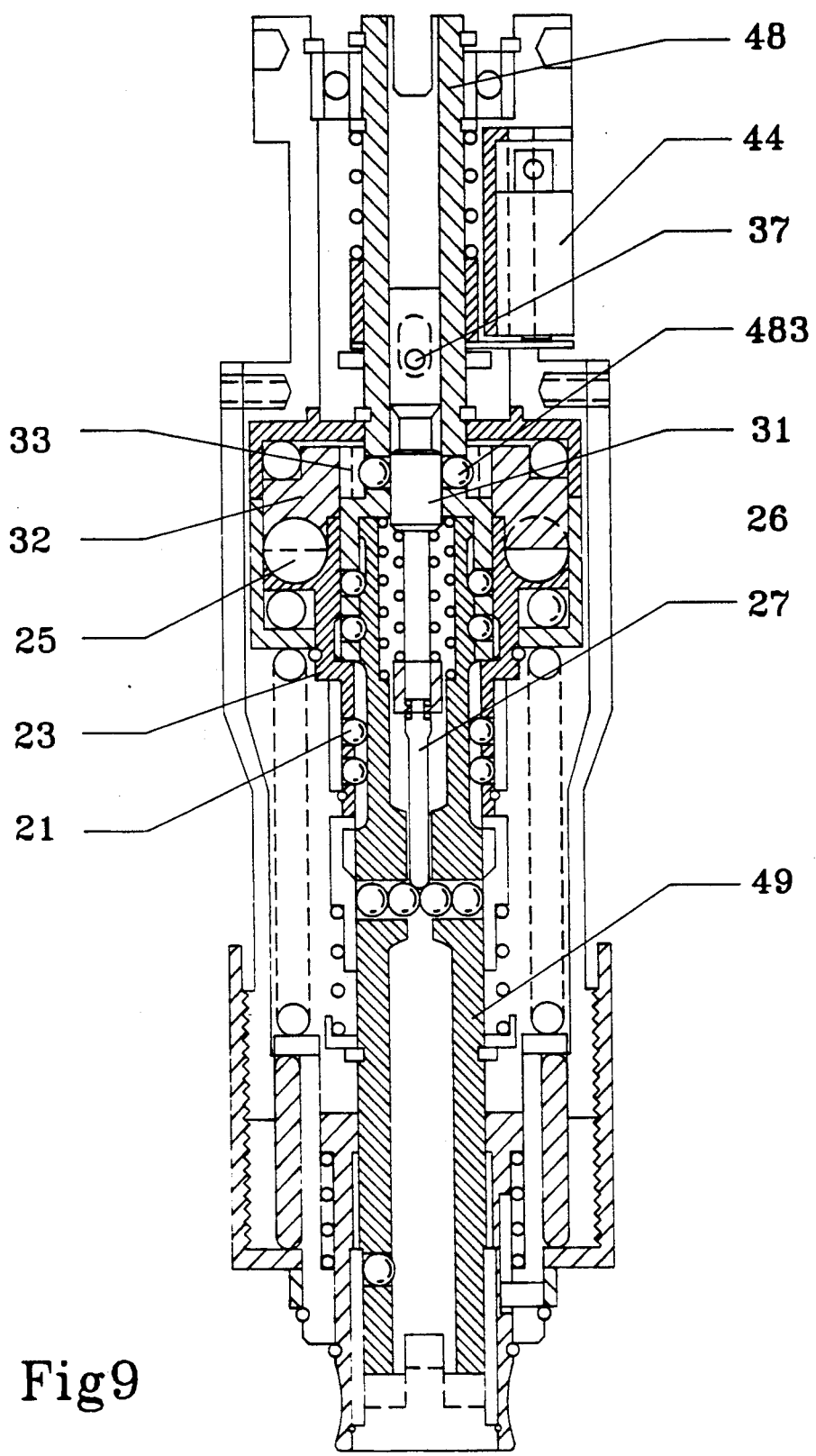
FIG. 9 is similar to FIG. 8 but showing the transmission mechanism started.

Referring to FIGS. 8 and 9, as the bit P is pressed on the screw to be turned, the output shaft 49 is pushed to carry the central control rod 27 upwards, causing the spring pin 37 to switch on the microswitch 44 in turning on the motor B. As the motor B is started to turn on the main shaft 48 via the speed reducing gear D, the sliding bushing 31 is moved upwards by the neck portion 273 of the central control rod 27 to push the first steel ball set 483 outwards to engage with the roller set 33, and therefore the upper driven member 32 is carried to rotate. As the upper driven member 32 is rotated, the lower driven member 23 is driven by the cam 321 via the fourth steel ball set 25 to turn the output shaft 49 via the second metal ring 20 and the second steel ball set 20.

Figure 10:
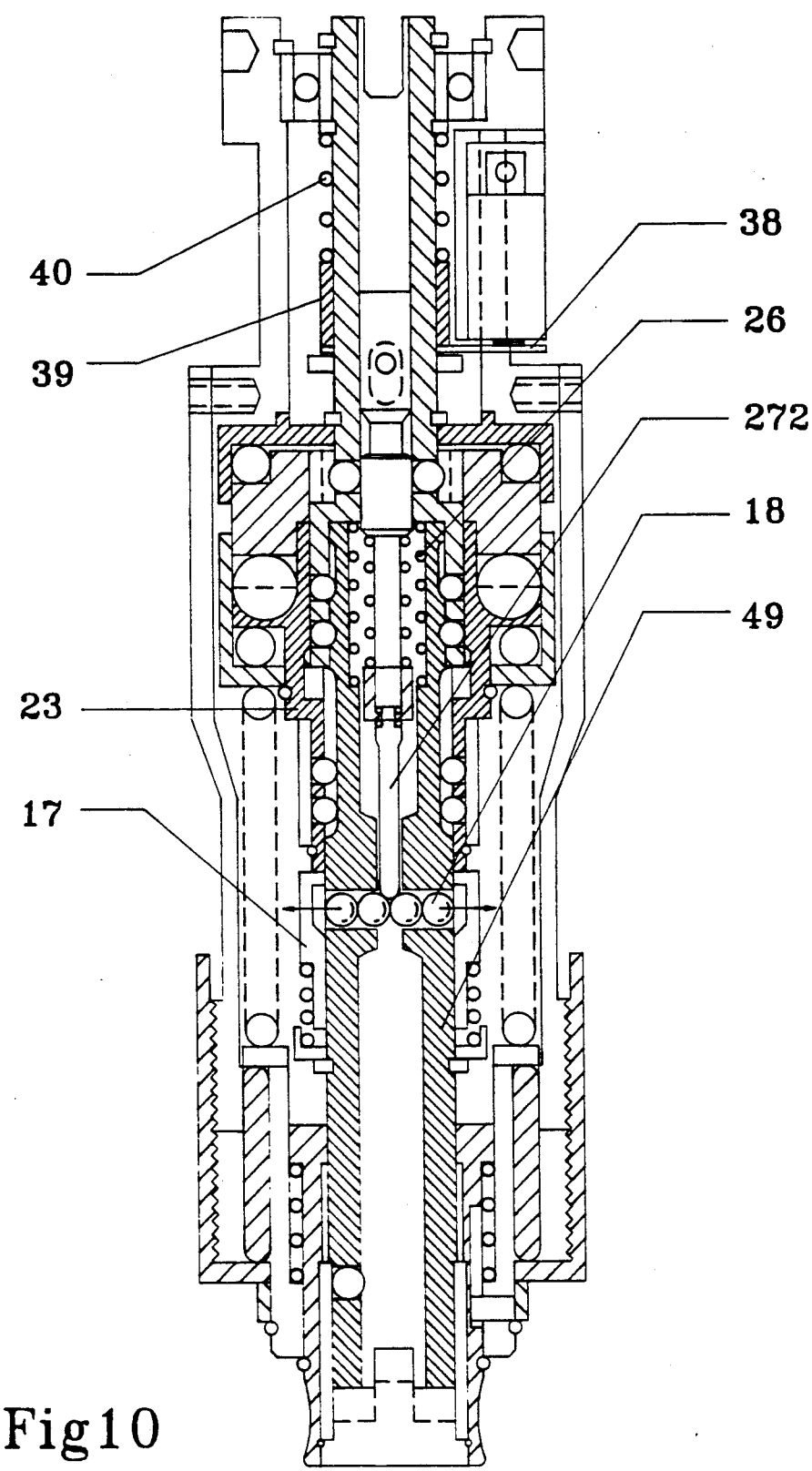
FIG. 10 is similar to FIG. 8 but showing the operation of the transmission mechanism as the torque reaches the predetermined range.
Figure 11:
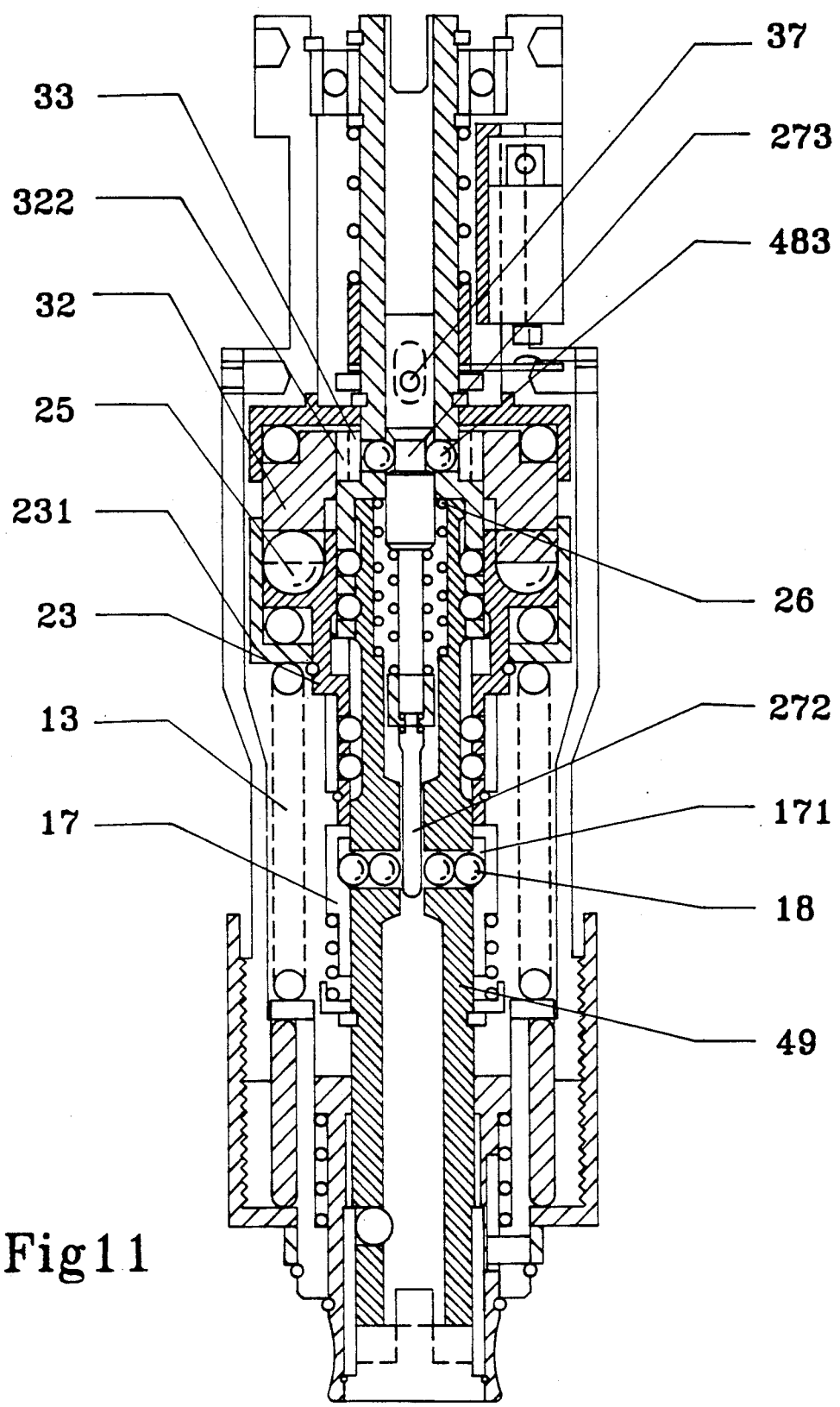
FIG. 11 is similar to FIG. 8 but showing the output power released to stop the operation.
Figure 12:
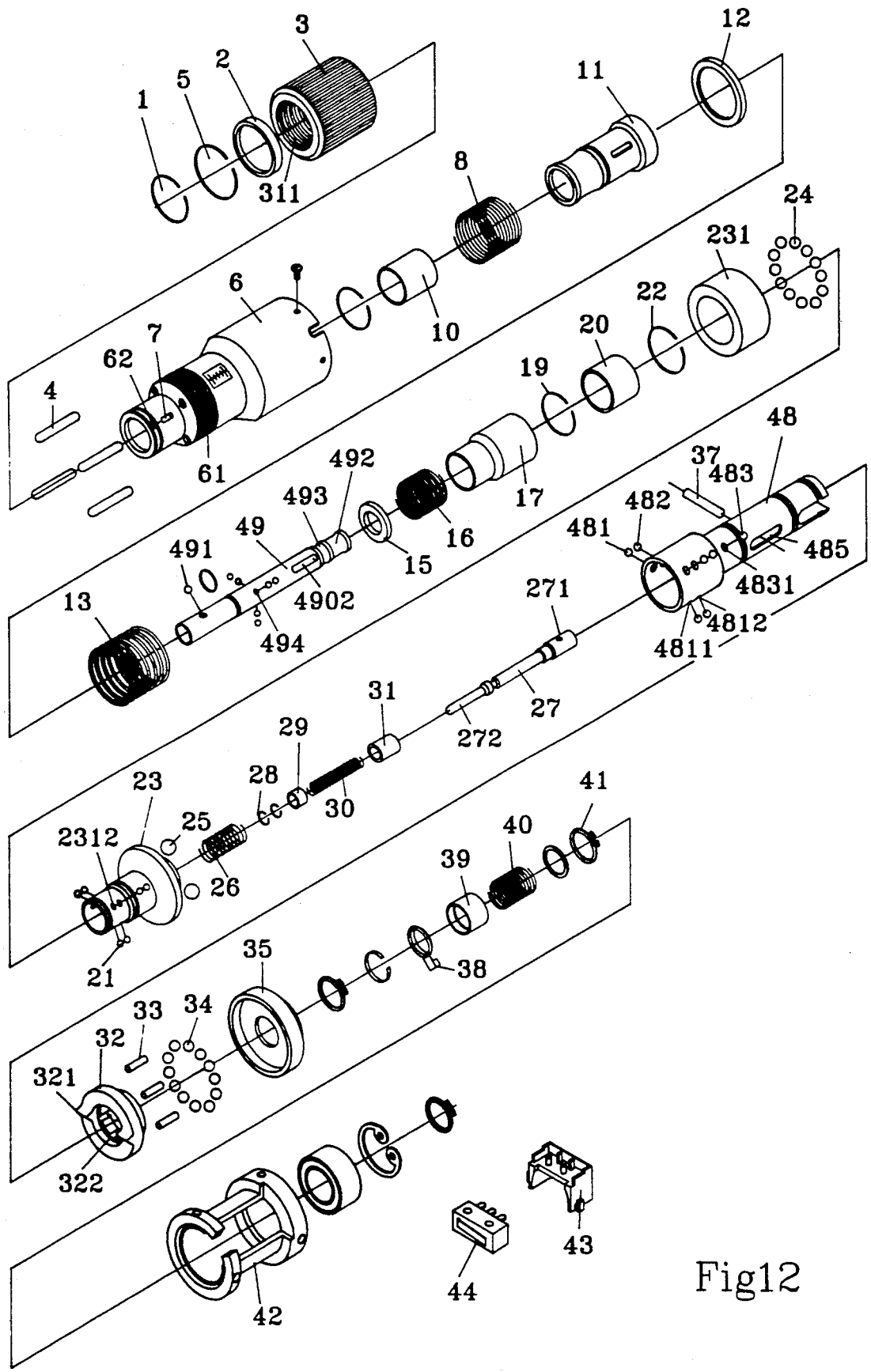
FIG. 12 is a perspective exploded view of the automatic overload release and power stoppage device of the present invention.

Referring to FIGS. 10 and 11, as the screw is tightened up, the torque surpasses the tensile force of the torque control spring 13, the fourth steel ball set 25 is moved along the sloping outside surface of the upper driven member 32 to the peach of the cam 31 to push the lower driven member 23, the lower thrust bearing 231, and the release control ring 17 downwards. As the release control ring 17 is moved downwards, the fifth steel ball set 18 becomes received in the inside space 171 of the release control ring 17 for allowing the tip 272 of the central control rod 27 to pass through the space defined within the fifth steel ball set 18, and therefore the central control rod 27 is allowed to move downwards. As the central control rod 27 moves downwards, the spring pin 37 is released from the microswitch 44, causing the microswitch 44 to turn off the motor B. At the same time, the neck portion 273 of the central control rod 27 is moved towards the first steel ball set 483 to further carry the first steel ball set 483 away from the roller set 33, and therefore the output power is released from the lower driven member 23, and the output shaft 49 is then stopped.

Referring to FIGS. 11 and 8, as the output shaft 49 is pushed back to its former position by the spring 26, the fifth steel ball 18 is carried away from the tip 272 of the central control rod 27 for permitting the release control ring 17 to be pushed back by the third spring 16 to contact the lower driven member 23. At the same time, the central control rod 27 is moved downwards to its former position by the spring 40, the switch control lever 38, and the bushing 39.

Figure 13:
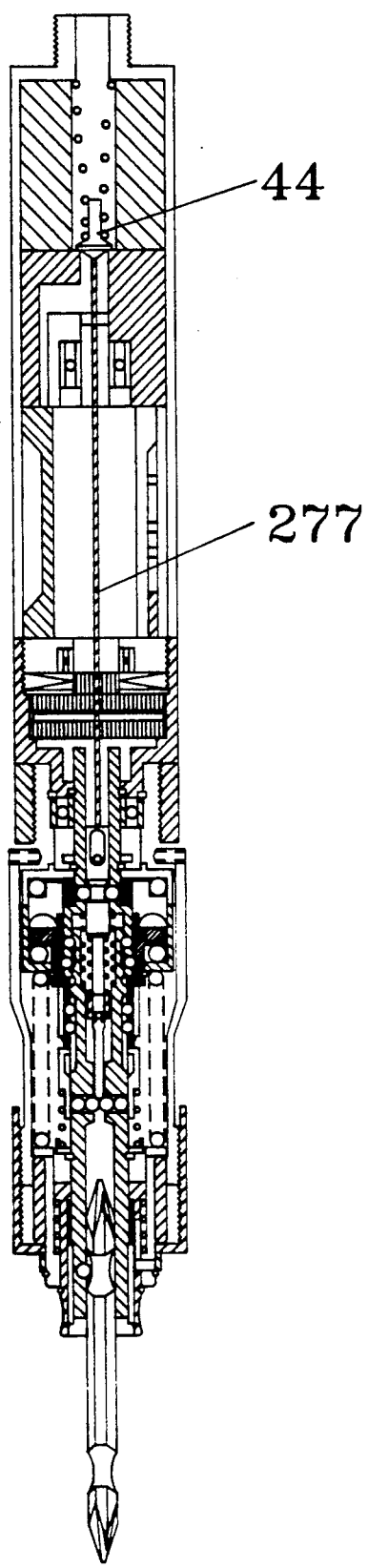
FIG. 13 is a sectional view showing the automatic overload release and power stoppage device of the present invention installed in a pneumatic screw driver.
Figure 14:
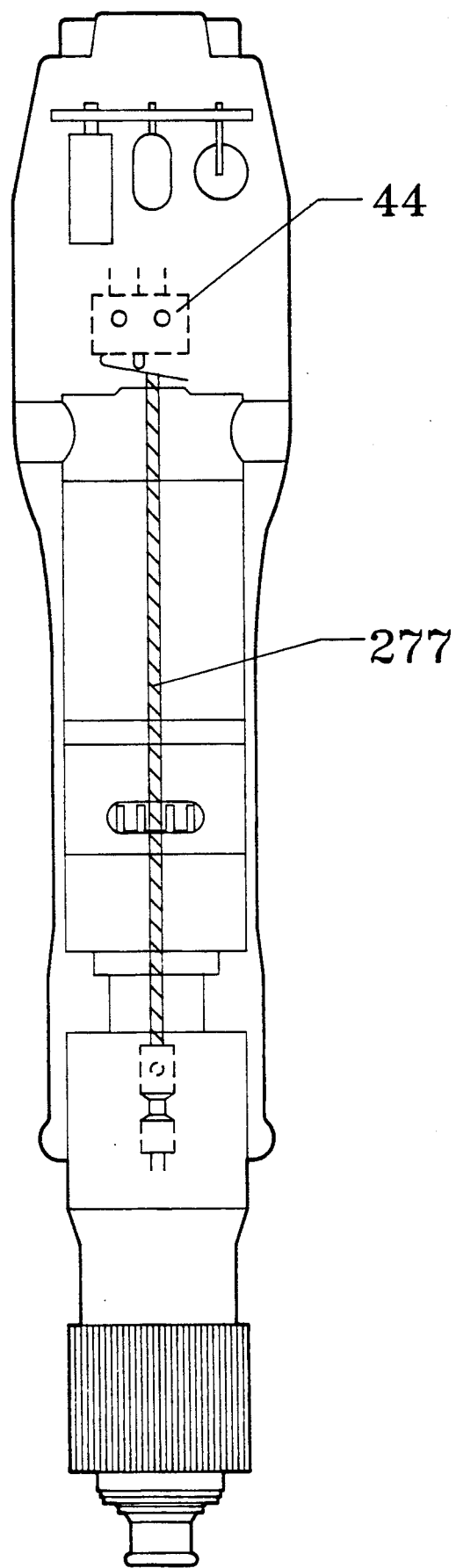
FIG. 14 is a sectional view showing the automatic overload release and power stoppage device of the present invention installed in a motor-driven screw driver.
Figure 15:
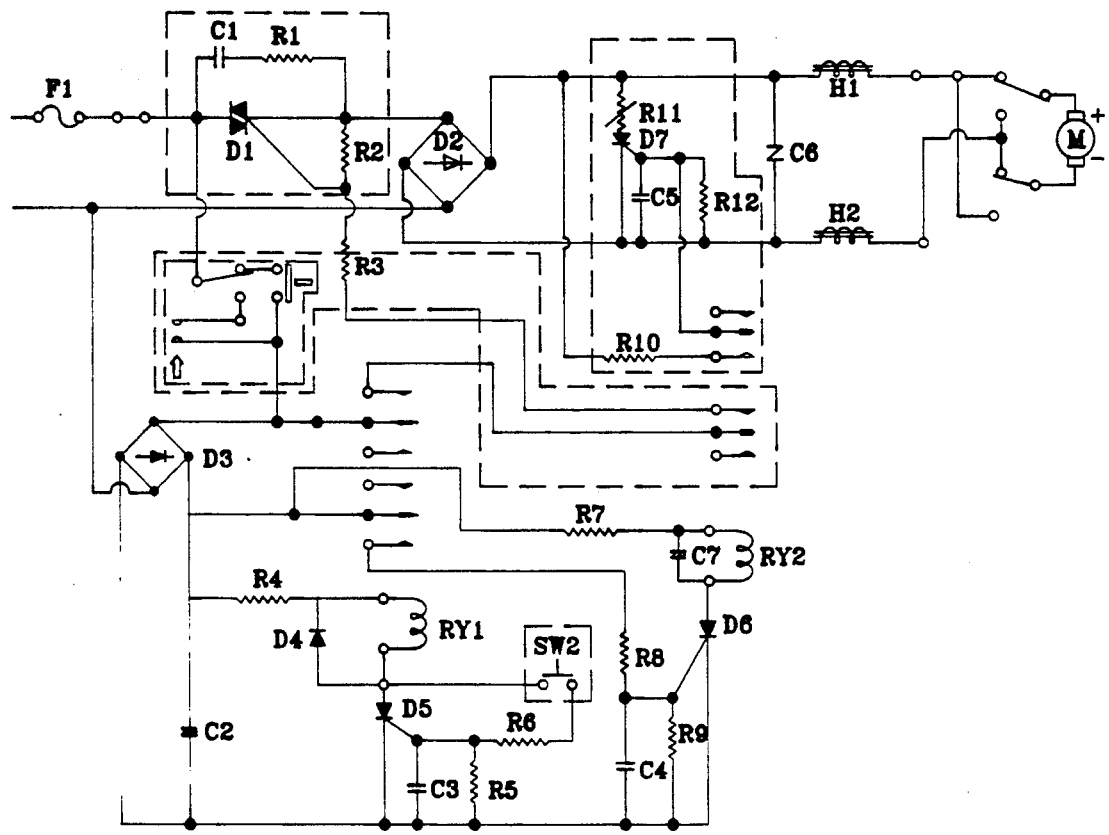
FIG. 15 is a circuit diagram of an overload circuit breaker for according to the prior art.
Figure 16:
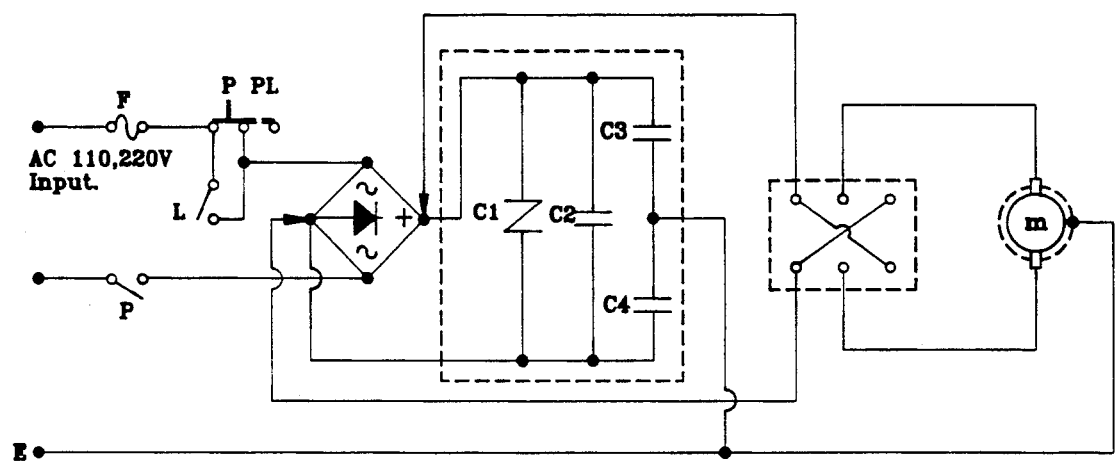
FIG. 16 is a circuit diagram of the present invention.

As indicated, the structure of the automatic overload release and power stoppage device is compact and precise. Its installation is also easy. As illustrated in FIGS. 13 and 14, the present invention can be installed in a normal pneumatic screw driver or a motor-driven screw driver for overload protection. The central control rod 27 may be made with a link 277 connected to the air valve 44 (see FIG. 13) or microswitch 44 (see FIG. 14). The embodiment shown in FIG. 2 eliminates the arrangement of the link and therefore the problem of mechanical sticking is eliminated.

While only few embodiments of the present invention have been shown and described, it will be understood that various modifications and changes could be made without departing from the spirit and scope of the invention.

What is claimed is:

1. An automatic overload release and power stoppage device installed in a power tool having a power switch, a rectifier circuit, a motor, a fan, and a speed reducing gear, comprising;
   a central control mechanism consisting of a central control rod, a first stop ring, a first metal ring, a first spring, a sliding bushing, a spring pin, a switch control lever, a second spring, and a second stop ring, wherein said central control rod has a through hole into which said spring pin is inserted to link said switch control lever for controlling said power switch;
   a power switching mechanism consisting of said sliding bushing, a ring-shaped upper driven member, a roller set, a first steel ball set, and a main shaft, wherein said sliding bushing is controlled by said central control rod to move said first steel ball set radially, causing said first steel ball set to control the engagement between said main shaft and said roller set for power transmission;
   a power output mechanism consisting of a third stop ring, a second metal ring, a second steel ball set, a fourth stop ring, a lower driven member, a lower thrust bearing, a third steel ball set, a fourth steel ball set, a third metal ring, an output shaft, and a steel ball, wherein said upper driven member, said lower driven member, and said output shaft are linked and turned by said main shaft as said central control mechanism and said power switching mechanism are started upon depression of said output shaft;
   a torque control mechanism consisting of a fifth stop ring, a sixth stop ring, a torque regulating ring, a round rod, a seventh stop ring, a torque member holder, a spring washer, a torque control spring said third stop ring, said second metal ring, said second steel ball set, said fourth stop ring said lower thrust bearing, said third steel ball set, said fourth steel ball set, and said upper and lower driven members, wherein said torque regulating ring is moved to change its position relative to said torque member holder so as to set a predetermined critical torque for permitting said upper and lower driven members to disconnect from each other as the torque from said power output mechanism surpasses said critical torque; and a release control mechanism consisting of a third spring, a release control ring, a fifth steel ball set, said central control rod, said first stop ring, said first metal ring, said first spring, and said sliding bushing, wherein said release control ring is pushed by said lower driven member to carry said central control rod downwards as the torque of said power output mechanism surpasses said critical torque.

2. The automatic overload release and power stoppage device of claim 1 wherein said sliding bushing is made to slide on said central control rod for permitting said central control rod to be pushed upwards by said first spring to switch on said power switch as said upper driven member, said roller set, and said first steel ball set are aligned.

3. The automatic overload release and power stoppage device of claim 1 wherein said sliding bushing is slidably mounted around a neck portion on said central control rod and retained in place by said first spring and said first metal ring, and moved to control the position of said first steel ball set.

4. The automatic overload release and power stoppage device of claim 1 wherein said roller set is disposed inside said upper driven member adjacent to said main shaft and said first steel ball set and controlled by said sliding bushing to act with said first steel ball in transmitting power.

5. The automatic overload release and power stoppage device of claim 1 or 4 wherein said upper driven member comprises a unitary cam symmetrically disposed around a center through hole thereof.

6. The automatic overload release and power stoppage device of claim 1 wherein said lower driven member comprises a recessed inside space moved to hold said sixth steel ball set in an annular groove on said output shaft so as to prohibit axial movement of said output shaft.

7. The automatic overload release and power stoppage device of claim 1 wherein said release control ring comprises a recessed inside space moved downwards to hold said fifth steel ball set for permitting said central control mechanism to be moved downwards 8. The automatic overload release and power stoppage device of claim 7 wherein said fifth steel ball set is symmetrically mounted on said output shaft to control the inside space of said release control ring, for permitting said central control mechanism to be moved upwards and downwards as said output shaft is moved axially.

* * * * *